United States Patent [19]

Connors

[11] 4,150,379

[45] Apr. 17, 1979

[54] MATCHED FILTER TARGET ACQUISITION RADIOMETRIC SYSTEM

[75] Inventor: Joseph L. Connors, Dunedin, Fla.

[73] Assignee: Sperry Rand Corporation, New York, N.Y.

[21] Appl. No.: 804,965

[22] Filed: Jun. 9, 1977

[51] Int. Cl.² ............................ G01J 1/00; G01S 3/56
[52] U.S. Cl. .............................. 343/100 ME; 343/7.4; 343/117R; 343/118
[58] Field of Search ............ 343/100 ME, 7.4, 117 R, 343/118

[56] References Cited

U.S. PATENT DOCUMENTS

| 2,410,831 | 11/1946 | Matbarduk et al. | 343/7.4 |
| 3,787,857 | 1/1974 | Lazarchik et al. | 343/100 ME |
| 3,883,876 | 5/1975 | Roeder et al. | 343/100 ME X |

Primary Examiner—T. H. Tubbesing
Assistant Examiner—Richard E. Berger
Attorney, Agent, or Firm—Howard P. Terry

[57] ABSTRACT

The matched filter target acquisition radiometric system employs a composite scanning system in searching, acquiring, and tracking relatively small targets on a background of large-magnitude, widely-fluctuating-noise generating terrain. Search for a target is accomplished by a combined circular and conical scan antenna system that generates characteristic invariant wave forms when the circularly symmetric antenna pattern sweeps across a target, patterns that are readily recognized by a matched filter signal processing system, thereupon shifting operation of the antenna control system to a conical scan automatic tracking mode.

13 Claims, 9 Drawing Figures

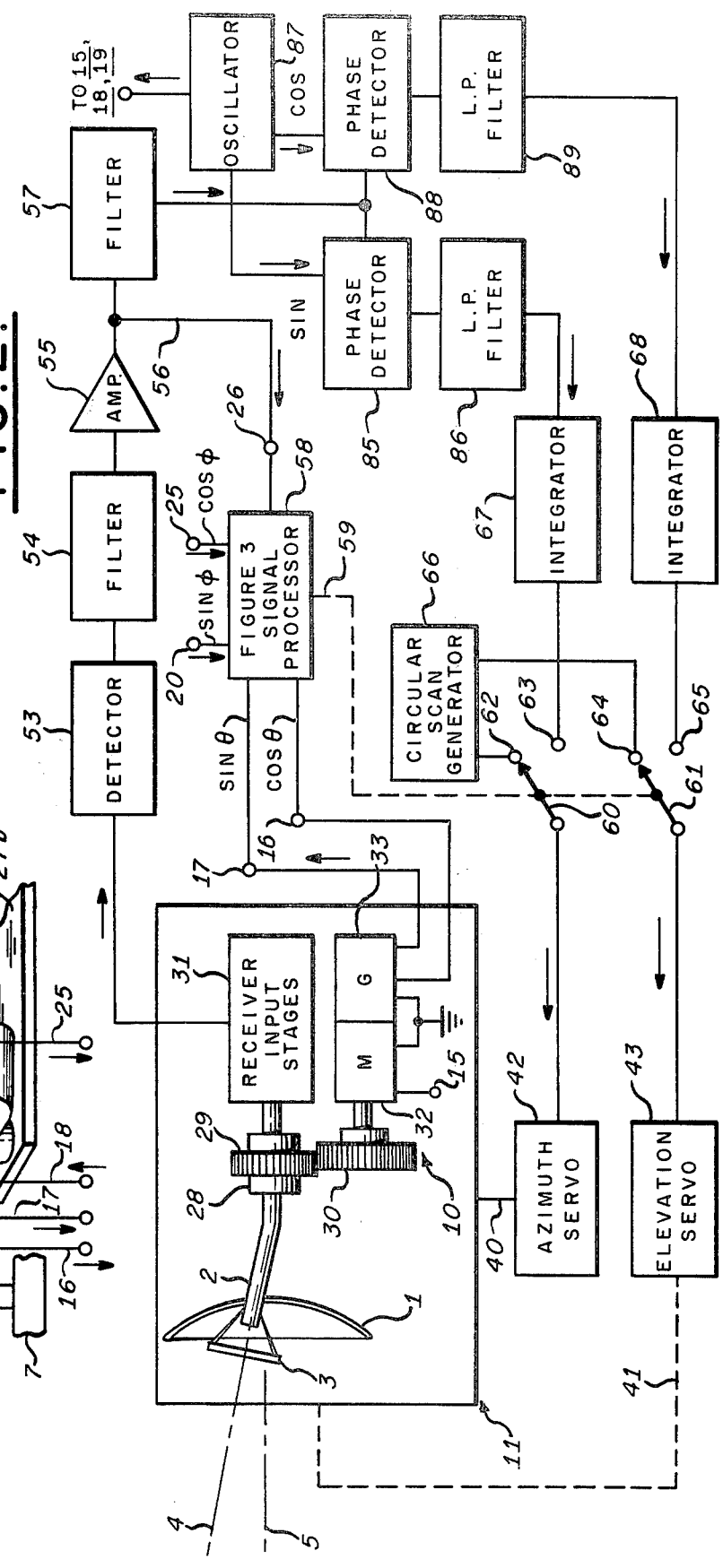

MATCHED FILTER TARGET ACQUISITION RADIOMETRIC SYSTEM

BACKGROUND OF THE INVENTION

1. Field of the Invention

The invention pertains to radiometric devices for seeking targets against the high background noise temperature of the earth's surface and more particularly relates to radiometric systems adapted to detect special characteristics of targets, even though immersed in such noisy environments, by the processing of received signals representative of those special characteristics and by their recognition by matched-filter processing apparatus.

2. Description of the Prior Art

Radiometric target searching and tracking systems are well known in the art and are generally characterized by several faults making them not totally satisfactory for use in high noise level environments, such as in detecting relatively small metal objects like vehicles in a background of ground clutter. In particular, prior devices employing conventional types of scanning antenna systems generally have a limited field of view so that search of an area of reasonable size requires an unreasonable amount of time. Furthermore, a conventional automatic acquisition system consisting primarily of an envelope detector may have an output wave form caused by the background an order of magnitude greater than the corresponding wave form caused by a target. The conventional envelope detector does not utilize unique features of a target which distinguish it from the background. These and further defects of the prior art remain to be discussed in greater detail.

SUMMARY OF THE INVENTION

The present invention relates to high frequency radiometric object detection devices for searching for and tracking targets against the high background noise of the earth's terrain. The novel radiometer target-seeking device is adapted to detect special characteristics of a relatively small target even though the target is located on terrain yielding a high background noise level that would ordinarily mask the presence of the target. The nature of the composite antenna scanning pattern during relatively wide angle search and of the radiometric signal processing system is such that a target regularly generates the same wave form therein, regardless of the position of the target with respect to the conical scan axis. The invariant wave forms thus generated permit the use of matched filter detection apparatus readily recognizing the presence of such invariant wave forms and readily recognizing the presence of the small target for initiating automatic tracking. Because the matched filter technique is the optimum technique for detecting a known invariant signal in a background of severe noise clutter, the probability of detection of such small objects is greatly enhanced. In addition, the process of target recognition and of transfer to the automatic tracking mode is much faster than is achieved by prior art concepts. An essential feature of the invention lies in the effective rotation of the phase reference of the conical scan system so that a desired invariant wave form is generated, no matter where the target may be with respect to the superimposed circular search pattern. In place of using the prior art azimuth and elevation directions as reference directions, the new reference directions are directed tangentially and radially with respect to the circular component of the search pattern.

BRIEF DESCRIPTION OF THE DRAWINGS

FIG. 1 is a perspective view of the antenna system used in the invention.

FIG. 2 is a block diagram of the novel radiometric system showing its electrical components and their interconnections.

DESCRIPTION OF THE PREFERRED EMBODIMENTS

Figure 3:
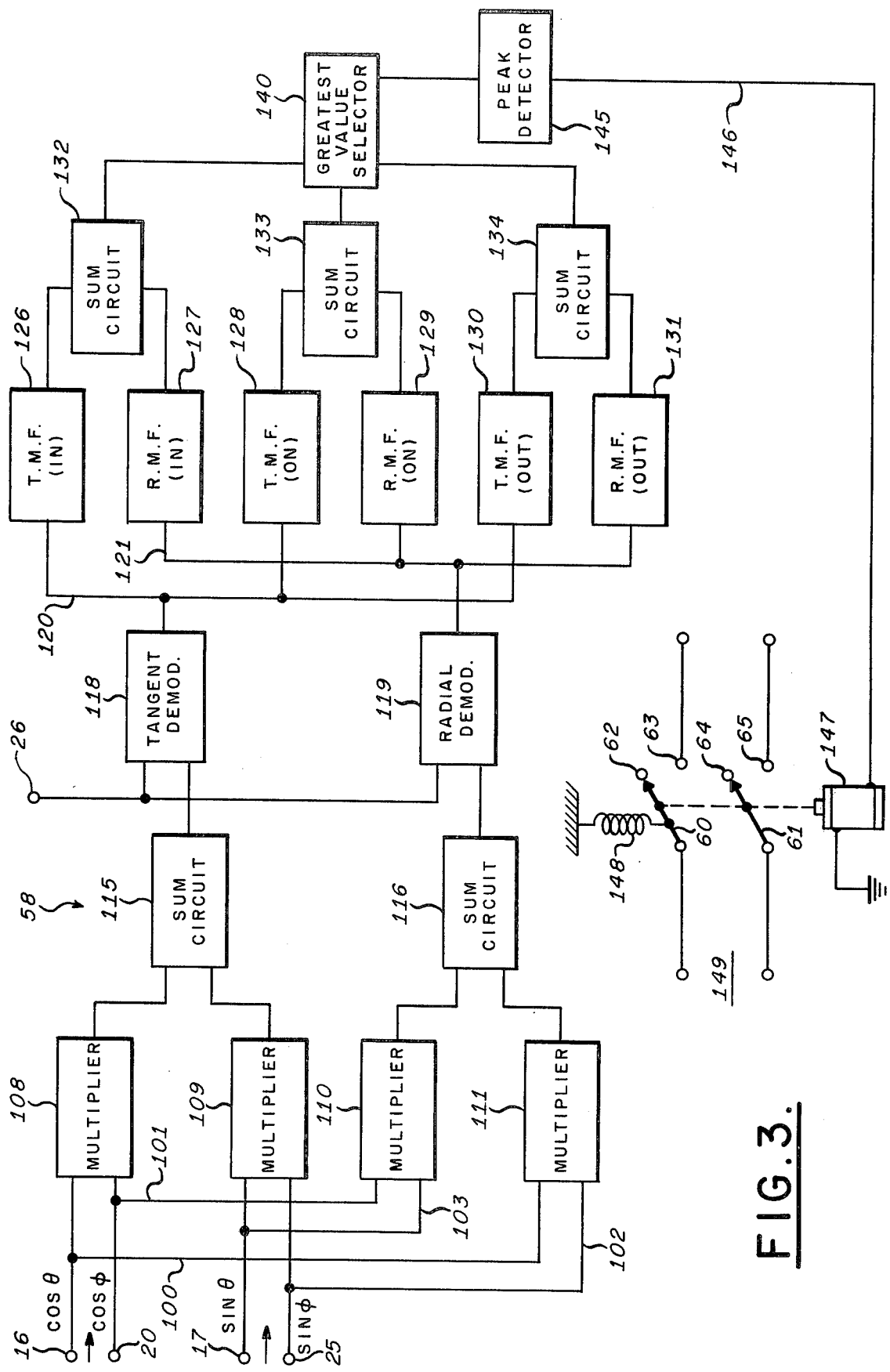
FIG. 3 is a block diagram of the novel signal processor 58 of FIG. 2.

The apparatus of the present invention finds utility in microwave radiometric object detector systems of the kind employed in searching, acquiring, and automatically tracking relatively small metal objects such as trucks or other vehicles whose microwave energy-radiating properties generally vary over a wide range. In particular, the targets involved are often small in comparison to the angular region subtended by the circularly symmetric antenna receptivity pattern, the characteristics of that pattern being dictated by the nature of the search function. For example, at the normal acquisition range between the target and the radiometric system, target size may even be an order of magnitude smaller than the cross section of the antenna receptivity pattern where the latter intercepts the earth. If the noise from the background surrounding the target were ideally homogeneous and constant, it would be possible to detect even a point target; but the background inherently fluctuates. Such fluctuations have a relatively low frequency spectrum and mask small targets, making their detection difficult. However, it is to be observed, when a relatively large diameter antenna receptivity pattern cross section is swept across a substantially point target, that the target output signal of the cooperating receiver is essentially a trace of the cross section of the antenna receptivity pattern.

In the radiometric system of the present invention, an unusual antenna scanning system is employed so that search and track functions may be selectively effected with facility. Further, the nature of the scanning system is beneficially such that optimum matched filtering techniques may also be employed to improve target detection relatively independent of the nature of background noise signals, thus facilitating the transition from the search mode of the system to its automatic tracking mode.

The background noise usually consists of signals from expanses of trees or from lakes or fields, all of relatively large magnitude and varying slowly in amplitude. The feature which distinguishes actual targets from such background terrain is physical size. The desired targets are relatively smaller than the antenna receptivity pattern cross section, while the background features cover a much wider area; the total signal from the terrain can be several times greater than the signal from the sought-for target. Accordingly, the present invention employs a matched filter technique to exploit the differences in physical size by discrimination on the basis of physical size.

As in FIG. 1, it is seen that the antenna employed in the invention is of generally conventional nature, being of the kind that is well known in the prior art for selective searching and tracking, therefore making any detailed description of the physical structure of the antenna unnecessary here. The antenna drive and gimbal support system may be of the general type disclosed, for instance, in the L. A. Maybarduk et al U.S. Pat. No. 2,410,831, issued Nov. 12, 1946 for a "Scanning Device" and assigned to the Sperry Rand Corporation.

The antenna of FIG. 1 includes a paraboloid reflector 1 affixed by bracket member 6 to a frame portion 7 of the gimbal-mounted platform 11. Platform 11 has a normally horizontal axis journalled in gimbal 22 which gimbal, in turn, is journalled for oscillation about a normally vertical axis in the frame 27a, 27b of the vehicle. The horizontal axis is supplied with a drive motor 23 excited via terminal 18 from oscillator 87 and a conventional reference signal generator 24 supplying elevation reference signals at terminal 25 with respect to the azimuth position of gimbal 22. In like manner, the antenna system is provided with an azimuth driving motor-azimuth reference generator 21, the drive motor being excited via terminal 19 from oscillator 87 and azimuth position reference signals being supplied by the device 21 at terminal 20 in the usual manner.

The antenna of FIG. 1 further includes an angularly offset wave guide 2 projecting through a clearance hole in paraboloid 1 and supported in rotary drive 10 from platform 11. Energy collected by paraboloid 1 is reflected by a disc 3 supported in front of the aperture of wave guide 2 into the guide itself. The axis 4 of guide 2 is spun about the axis of symmetry 5 of the antenna by virtue of rotary joint 28, gearing 29, 30, and spin drive motor 32 as shown in FIG. 2. Motor 32 is driven by power coupled at terminal 15 which again may be supplied by oscillator 87. As a consequence of its rotation about axis 5, the guide 2 is adapted to perform conical scanning immediately about the terrain intercepted by axis 5 of a circularly symmetric antenna pattern, as is required for automatic tracking purposes. The rotary drive 10, as seen in FIG. 2, also includes a two-phase spin reference generator 33 of conventional type; it supplies signals representative of $\cos \theta$ and $\sin \theta$ conical scan position voltages at the respective terminals 16, 17, where the angle $\theta$ is defined in FIG. 4 as the angle between the conical scan reference direction 181 and the line 179 indicating the instantaneous direction of guide 2.

Figure 4:
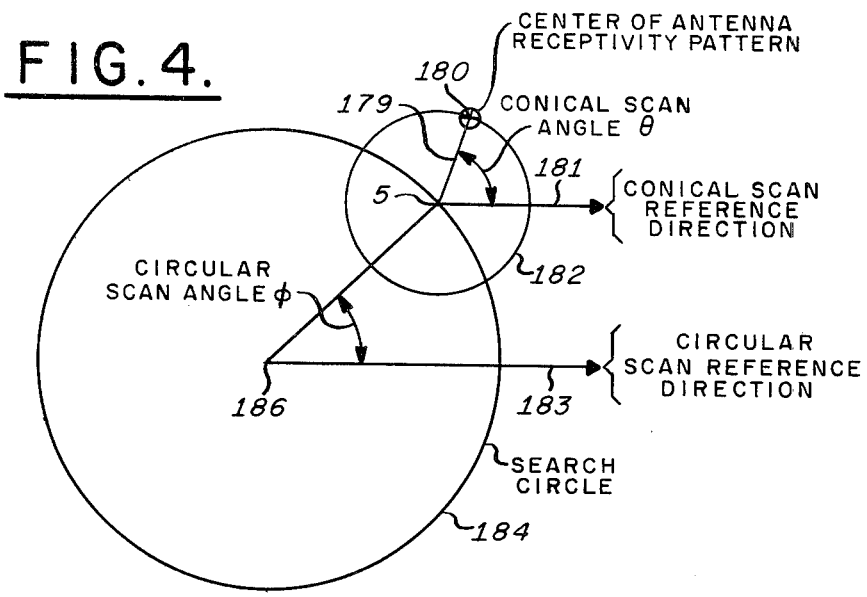
FIG. 4 is a diagram useful in explaining the operation of the antenna system of FIGS. 2 and 3.

The respective azimuth and elevation gimbal drive motors 21 and 23 are illustrated as included in FIG. 2 within the respective azimuth and elevation servos 42 and 43, along with appropriate power servo amplifiers. They respectively drive the axes of the gimbal system of FIG. 1, as is indicated symbolically by the mechanical links 40 and 41 of FIG. 2. In the present invention, the apparatus is arranged so that the combined effect of operation of gimbal drive motors 21, 23 is to oscillate platform 11 sinusoidally in azimuth and in elevation so that the axis of symmetry 5 travels in a relatively large circular orbit 184 (FIG. 4) about principal axis 186. As a consequence of the combined motion, which is exercised during search for a target, voltages representative of $\sin \phi$ and $\cos \phi$ are generated at terminals 20, 25, where the angle $\phi$ is defined in FIG. 4 as the instantaneous angle between the circular reference scan direction and the line from the center 186 of circular scan to the center 5 of conical scan. This operation is normally achieved when switches 60 and 61 are in contact with the respective terminals 62, 64, connecting the respective servos 42, 43 to outputs of circular scan generator 66. Generator 66 is a conventional device for generating out-of-phase control voltages for producing the desired out-of-phase cyclic sinusoidal and cosinusoidal motions of platform 11 about its mutually perpendicular axes, accordingly producing circular scan of axis 5. Therefore, it is readily seen by those skilled in the art that a relatively large circular scan 184 of the circularly symmetric antenna receptivity pattern is produced with a smaller circular or conical scan 182 imposed thereon so that the pattern proceeds in a helical path about locus 186. In FIG. 4, the center of the antenna pattern is seen at 180. The conical scan reference direction 181 and the circular scan reference direction 183 are also illustrated. The circular scan rate may be at a relatively slow rate such as one revolution per second, for example, while the conical scan rate is preferably higher, such as at one hundred revolutions per second.

Figure 5:
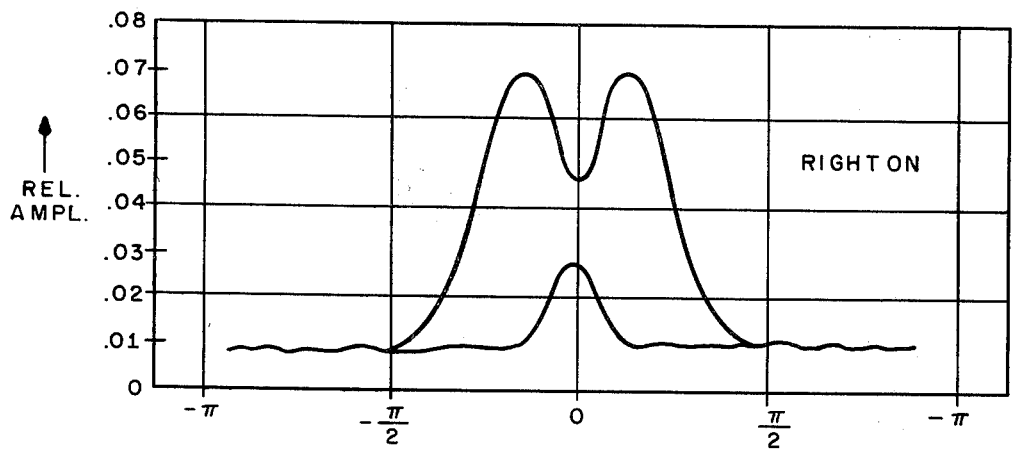
FIGS. 5 through 9 are graphs useful in explaining the operation of the invention.
Figure 6:
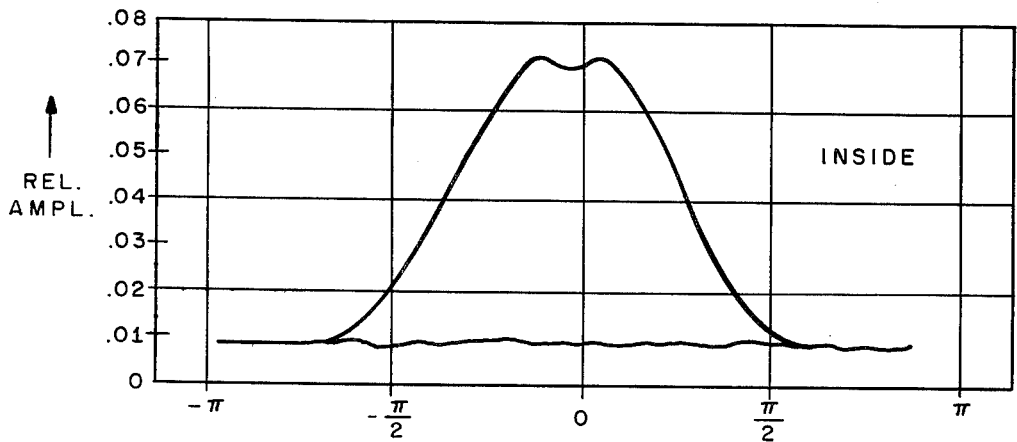
Figure 7:
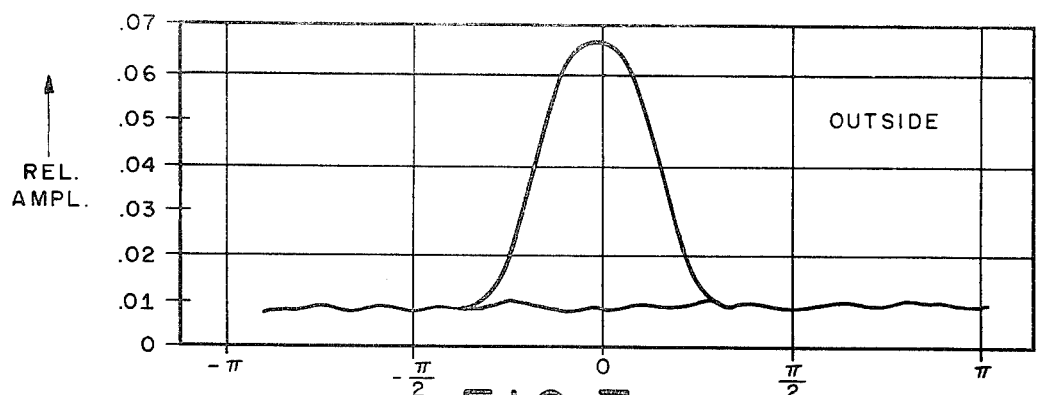

FIGS. 5, 6, and 7 illustrate the envelopes that would be generated at detector 53 by this combined search pattern as a point target is traversed in various locations relative to the circle 184. The "right-on" condition refers to the target being directly on the circle 184, while "inside" and "outside" mean that the target location is removed from circle 184 by approximately the conical scan squint angle. Only the envelopes are shown. The actual detected video signals are high frequency signals which fluctuate between the two extremes of the envelope. It would be difficult and often impossible to employ conventional detection techniques to locate precisely a point target yielding useful signals in the normal masking background noise situation. However, the wave forms depicted in FIGS. 5, 6, and 7 contain certain components that are invariant in quality; for example, no matter at what circular scan angle $\phi$ the target is located, as long as it is on the large scan circle 184, it yields invariant components found in the wave form of FIG. 5 at the output of detector 53 of FIG. 2. In a similar manner, the conditions causing the generation of the envelopes of FIGS. 6 and 7 cause these wave forms to be characterized by invariant components independent of the circular scan angle $\phi$.

Recognition of the location of a point target with respect to the scan circle 184 is accomplished with respect to the several invariant wave forms by the signal processor 58 of FIG. 2 (device 58 remains to be explained in detail with respect to FIG. 3). For this purpose, signal processor 58 has several inputs, including inputs on terminals 16, 17, respectively representative of $\cos \theta$ and $\sin \theta$ values from spin reference generator 33, and also inputs on terminals 20, 25 respectively representative of the $\sin \phi$ and $\cos \phi$ signals of the gimbal position signal generators 21, 24. From the radiometric receiver elements 31, the received signals, after frequency conversion within receiver element 31, are supplied to a conventional video detector 53 and, thence, through filter 54, amplifier 55, and lead 56 to terminal 26 of processor 58. Filter 54 is a low pass filter excluding all undesired frequency components above one hundred cycles per second. Recognition by signal processor 58 of a desired target while circular scan generator 66 is supplying search control signals through switches 60, 61 to the respective servos 42, 43 causes mechanical link 59 to move blades 60, 61 to contact the respective terminals 63, 65, thus stopping search scan motion of the antenna gimbal system and causing the servos 42, 43 to change to operation in the automatic tracking mode. Electronic switching means may be substituted for switches 60, 61.

For effecting automatic azimuth and elevation tracking, the output of amplifier 55 is passed through low pass filter 57, is desired, and is supplied to a phase detection system having two channels for the generation of azimuth and elevation tracking error signals in the general manner previously employed widely in automatic tracking radar systems and in radiometric systems, for example, of the kind disclosed in the R. S. Roeder et al U.S. Pat. No. 3,883,876 for a "High Frequency Radiometric Target Seeking and Tracking Apparatus", issued May 13, 1975 and assigned to Sperry Rand Corporation; reference may also be had to the R. E. Lazarchik et al U.S. Pat. No. 3,787,857 for a "Dual Mode Radiometric System", issued Jan. 22, 1974 and also assigned to Sperry Rand Corporation.

In particular, the tracking system includes the sine wave phase reference oscillator 87 which, as previously noted, may also be used to supply driving signals at terminals 15, 18, 19 to the respective antenna scan motors 32, 23, 21. Oscillator 87 supplies respective sine and cosine phase reference signals to phase detectors 85, 88 which are also supplied with the conical scan video envelope output of amplifier 55. The phase detected outputs are respectively coupled through low pass filters 86, 89, if required, to cooperating integrators 67, 68. In this manner, the desired respective bipolar azimuth and elevation tracking error signals appear at terminals 63, 65. Since switch blades 60, 61 now contact the respective terminals 63, 65, the error signals respectively cause azimuth and elevation servos 42, 43 to drive the antenna system to track the target whose presence was detected by signal processor 58. Other types of known functions of conventional radiometric systems may be additionally performed.

Figure 8:
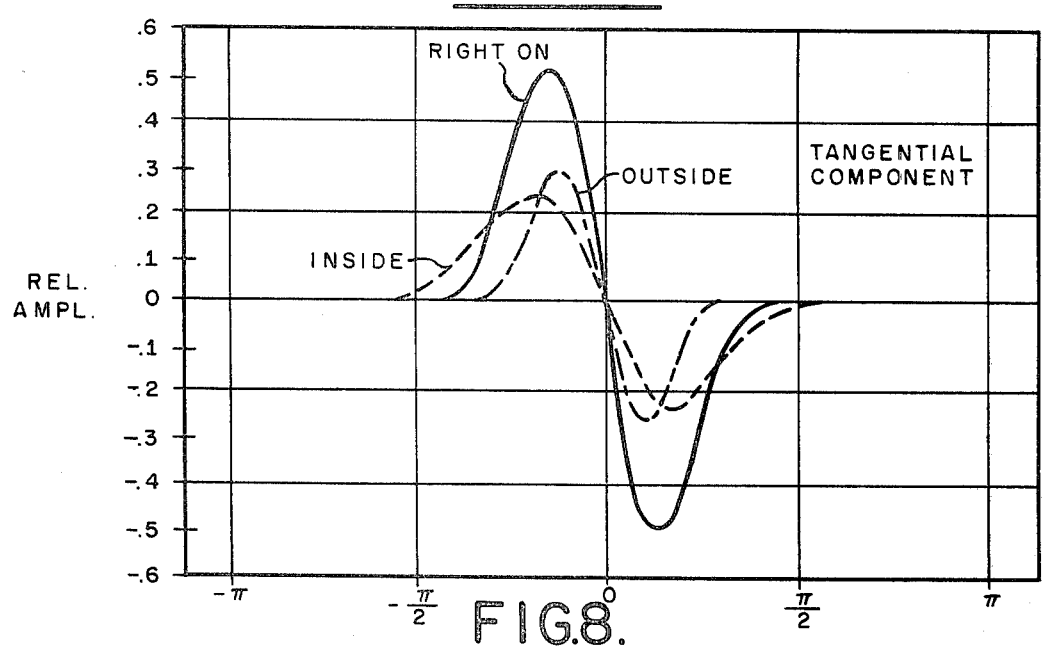
Figure 9:
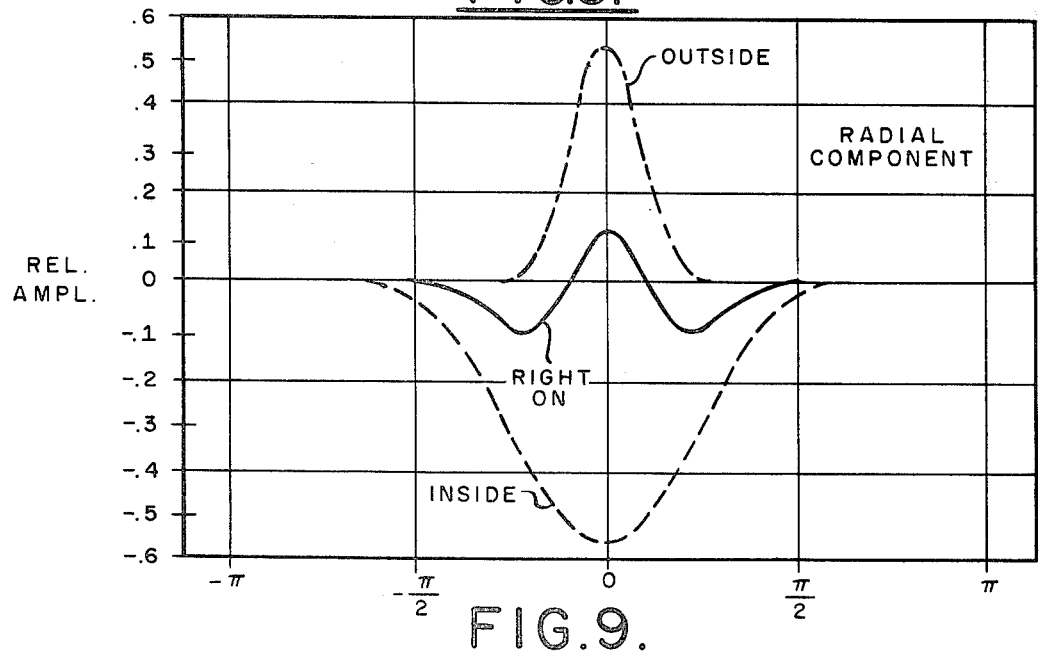

In conventional radiometric tracking systems, the raw video tracking signals are demodulated by multiplying them by the sine and cosine of the conical scan angle. If this is done, the result is two components of a spatial derivative, one component in the north-south direction and one component in the east-west direction. According to the present arrangement, the reference is rotated so that the components of the spatial derivative are tangential and radial to the search circle 184. In the present invention, two components of demodulated signals are formed in signal processor 58 as a point target is transversed at any of the three typical locations of the target with respect to the scanning circle 184. These components are formed with respect to the circular scan reference direction 183 (FIG. 4). FIG. 8 shows invariant tangential component waves formed according to the invention, while FIG. 9 shows corresponding invariant radial component waves formed according to the invention within signal processor 58, one or the other of the tangential and radial components appearing on the respective bus bars 120, 121 (FIG. 3). The character of the latter signals is then recognized by apparatus located at the right side of bus bars 120, 121, apparatus which generates the acquisition signal for causing a newly-discovered target to be automatically tracked.

FIG. 3 illustrates a preferred form of the processor 58 operating according to the principles of the invention. As noted, the portion of FIG. 3 to the left of bus bars 120, 121 performs the function of rotation of the phase reference needed to resolve the detected video of detector 53 through the continuously changing angle $(\theta - \phi)$, where $\theta$ is the phase angle of the conical scan with reference to line 181 and $\phi$ is the phase angle of the circular scan with reference to line 183, these lines being parallel. By resolution through the angle $(\theta - \phi)$ is meant that it is desired to multiply the detected video signal by $\cos(\theta - \phi)$ to obtain the radial component, and by $\sin(\theta - \phi)$ to derive the tangential component. As has been described, voltages representative of $\sin \theta$, $\cos \theta$, $\sin \phi$, and $\cos \phi$ are readily available from the antenna positioning system. Accordingly, recourse is taken to the following trigonometric identities to obtain the desired quantities:

$$\cos(\theta - \phi) = \cos \theta \cos \phi + \sin \theta \sin \theta$$

$$\sin(\theta - \phi) = \sin \theta \cos \phi - \cos \theta \sin \phi$$

As seen in FIG. 3, the signals on terminals 16 and 20 representing $\cos \theta$ and $\cos \phi$ are multiplied in a conventional multiplier 108 to produce a signal representative of $\cos \theta \cos \phi$, while signals on terminals 17 and 25 representative of $\sin \theta$ and $\sin \phi$ are similarly multiplied by a similar multiplier 109 in produce a signal representative of the product $\sin \theta \sin \phi$. The outputs of multipliers 108 and 109 are summed in circuit 115 to produce a signal representative of $\cos(\theta - \phi)$. In a similar manner, branching leads 101, 103 are used to convey signals representative of $\sin \theta$ and $\cos \phi$ to multiplier 110 to produce a signal representative of $\sin \theta \cos \phi$, while signals representative of $\cos \theta$ and $\sin \phi$ on leads 100, 102 are similarly multiplied in multiplier 111 to produce a signal representative of the product $\cos \theta \sin \phi$. The outputs of multipliers 110, 111 are algebraically summed by circuit 116 to produce the desired signal proportional to $\sin(\theta - \phi)$. To complete the calculation, the outputs of sum circuits 115, 116 are respectively applied in parallel to inputs of tangential demodulator 118 and of radial demodulator 119. These demodulators 118, 119, are conventional demodulators also supplied via lead 56 with the cyclically varying video signal envelope found at receiver output terminal 26. In this manner, the invariant tangential component signals of FIG. 8 appear on bus bar 120, while the invariant radial component signals of FIG. 9 are found on bus bar 121. Demodulators 118, 119 may contain conventional low pass output filters in the usual manner.

In the present invention, the presence of corresponding pairs of invariant tangential and radial signals having their particular characteristic wave forms is recognized by a set of conventional matched filters 126 through 131 having respective corresponding matched characteristics with respect to the wave forms. The matched filter is well known in the art as the optimum device for the detection or recognition of a signal of known wave form in the presence of noise, the matched filter having an impulse response that is the time-reversed image of the signal to be detected. The tangential matched filters 126, 128, 130 are coupled by bus bar 120 to the tangential demodulator 118, while the radial matched filters 127, 129, 131 are coupled by bus bar 121 to the output of radial demodulator 119. Tangential matched filters 126, 128, 130 respectively recognize the inside, on, and outside invariant wave forms of FIG. 8, while the radial matched filters 127, 129, 131 respectively recognize the inside, on, and outside invariant wave forms of FIG. 9. When recognition occurs, there results a characteristic output from the corresponding matched filter.

A true target is most likely to produce outputs in corresponding matched filters; for example, if the target is directly on the large scan circle 184, it will very likely produce sizeable outputs from the right on matched filter pair 128, 129. For similar reasons, the outputs of the pair of inside filters 126, 127 are coupled to a conventional sum circuit 132, the outputs of the pair of right on filters 128, 129 are coupled to the second sum circuit 133, and the outputs of the pair of outside filters 130, 131 are coupled to the third sum circuit 134. Any output from one of the sum circuits 132, 133, 134 represents recognition of an actual target and the occurrence of its peak is therefore detected by peak value detector 145. The transition from the search mode to the automatic tracking mode is then effected by coupling the output of peak detector 145, for example, via lead 146 to the solenoid 147 of an electromagnet relay 149, pulling switch blades 60, 61 downward to contact switch terminals 63, 64, thus supplying the tracking control signals to servos 42, 43 as shown also in FIG. 2. In the absence of an output from peak detector 145, the spring 148 of relay 149 holds the switch blades 60, 61 in contact with switch terminals 62, 64, permitting the control of the antenna motion by the circular scan generator 66.

Those skilled in the art will recognize that many variations may be made in the novel system within the scope of the invention; for example, a greatest value detector 140 may be used selectively to determine which of the three outputs of the sum circuits 132, 133, 134 is largest during one circular scan, storing the incoming signals for this purpose until all are available and then producing an output one circular scan later for actuating relay 149. In a similar manner, greatest value detector 140 may be caused to integrate respective outputs of sum circuits 132, 133, 134 over, say, three circular scans, actuating relay 149 one circular scan cycle later than the occurrence of the largest such integrated signal. In the simplest form of the invention, the outputs of the several matched filters 126 through 131 are simply added directly and then any total output above a predetermined threshold level arbitrarily set in peak detector 145 is used to actuate a latching relay 149. In some applications, relay 149 is never unlatched after automatic tracking is initiated; in others it may be manually or otherwise unlatched.

Accordingly, it is seen that the invention overcomes difficulties inherent in prior art radiometric target searching and tracking systems by providing a system particularly adapted to detect special invariant characteristics of target signals, even though immersed in heavy noise clutter, by processing received signals representative of those special invariant characteristics and by their recognition by matched-filter signal processing apparatus.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. In a high frequency target detector system:
    directive antenna means for providing a circularly symmetric antenna receptivity pattern with a directive axis,
    composite antenna control means for causing said antenna receptivity pattern cyclically to execute a conical scan pattern about a circular path,
    signal generator means cooperative with said directive antenna means for generating first and second sets of signals representative of the instantaneous angular positions of said antenna receptivity pattern with respect to said conical scan pattern and with respect to said circular path, respectively,
    receiver means responsive to said antenna means,
    signal processor means responsive to said first and second sets of signals and to said receiver means when said target lies within said antenna receptivity pattern for yielding at least one invariant output wave,
    recognition means responsive to said one invariant output wave for generating a recognition signal, and
    utilization means responsive to said recognition signal.

2. Apparatus as described in claim 1 wherein said composite antenna control means comprises:
    first control means for conically scanning said antenna receptivity pattern about a conical scan axis with respect to a first reference direction, and
    second control means for cyclically moving said conical scan axis along said circular path with respect to a second reference direction.

3. Apparatus as described in claim 2 wherein said signal generation means comprises:
    first positional reference means for generating respective signals representative of $\sin \theta$ and $\cos \theta$, where $\theta$ is the instantaneous angle between said first reference direction and the instantaneous conical scan angular position of said directive axis, and
    second positional reference means for generating respective signals representative of $\sin \phi$ and $\cos \phi$ where $\phi$ is the instantaneous angle between said second reference direction and said conical scan axis.

4. Apparatus as described in claim 3 wherein said signal processor means includes first computer means for computing a signal representative of $\cos(\theta - \phi)$.

5. Apparatus as described in claim 4 additionally including second computer means for computing a signal representative of $\sin(\theta - \phi)$.

6. Apparatus as described in claim 4 wherein said first computer means comprises:
    first multiplier means responsive to said signals representative of $\cos \theta$ and $\cos \phi$,
    second multiplier means responsive to said signals representative of $\sin \theta$ and $\sin \phi$, and summation means for summing the outputs of said first and second multiplier means.

7. Apparatus as described in claim 5 wherein said second computer means comprises:
    first multiplier means responsive to said signals representative of $\sin \theta$ and $\cos \phi$,
    second multiplier means responsive to said signals representative of $\cos \theta$ and $\sin \phi$, and
    summation means for subtracting the output of said second multiplier means from said first multiplier means.

8. Apparatus as described in claim 5 wherein said signal processor means additionally includes tangent demodulator means responsive to said signal representative of $\cos(\theta - \phi)$ and additionally responsive to said receiver means for producing at least one of a first plurality of invariant form wave outputs.

9. Apparatus as described in claim 8 wherein said signal processor means additionally includes radial demodulator means responsive to said signal representative of sin $(\theta - \phi)$ and additionally responsive to said receiver means for producing at least one of a second plurality of invariant form wave outputs.

10. Apparatus as described in claim 9 wherein said recognition means includes:
   at least a first matched filter means responsive to said tangent demodulator means for supplying an output signal when said one of a first plurality of invariant form wave outputs matches the characteristic of said first matched filter means, and
   at least a second matched filter means responsive to said radial demodulator means for supplying an output when said one of said second plurality of invariant wave form outputs matches the characteristic of said second matched filter means.

11. Apparatus as described in claim 10 wherein said outputs of said first and second matched filter means are coupled through summation means to said utilization means.

12. Apparatus as described in claim 11 wherein said utilization means comprises means for disabling the circular scan function of said composite antenna control means.

13. Apparatus as described in claim 12 wherein said utilization means additionally comprises means for enabling automatic tracking function of said composite antenna control means.

* * * * *